Figure 1:
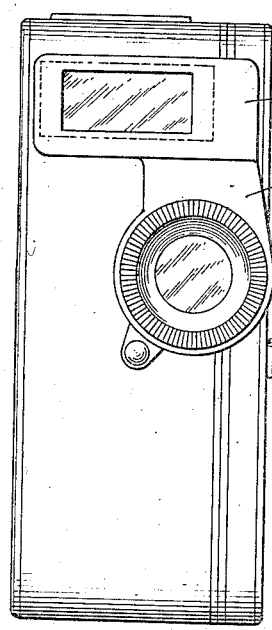

June 22, 1937.   H. KÜPPENBENDER   2,084,769
PHOTOELECTRIC EXPOSURE METER
Filed Feb. 8, 1936

Inventor
Heinz Küppenbender
By: B. Singer
Attorney

Patented June 22, 1937

2,084,769

UNITED STATES PATENT OFFICE 2,084,769

PHOTOELECTRIC EXPOSURE METER

Heinz Küppenbender, Dresden, Germany, assignor to Zeiss Ikon Aktiengesellschaft, Dresden, Germany Application February 8, 1936, Serial No. 62,983

2 Claims. (Cl. 88—23)

The invention relates to photo electric meters and particularly relates to an exposure meter of that type which is mounted on or combined with a photographic camera or a motion picture camera.

In a combination of a photo electric exposure meter and a camera it is desirable that the angle of incidence of the light rays energizing the photo electric cell corresponds to the picture angle of the lens system of the camera. If now the camera is provided with severally and selectively applicable lens systems of different focal length, this condition is not always met, because each of such lens systems obviously has a different picture angle, and if this condition is not compensated for the exposure meter measurements may be wrong.

It is now an object of the invention to avoid faulty measurements of the photo electric exposure meter by providing each of the severally and selectively applicable lens systems with a diaphragm for differentially shielding the photo electric cell against the incoming light rays. The diaphragm is adapted to restrict or augment respectively the amount of light which reaches the photo electric cell if a lens system having a certain picture angle is substituted by a lens system having another picture angle.

Another object of the invention resides in the provision of means for covering the photo electric cell when the latter is not in use so that no light rays can reach the same. Said means uncover the photo electric cell when the exposure meter is used for effecting a measurement.

The drawing illustrates by way of example one embodiment of the invention.

Figure 2:
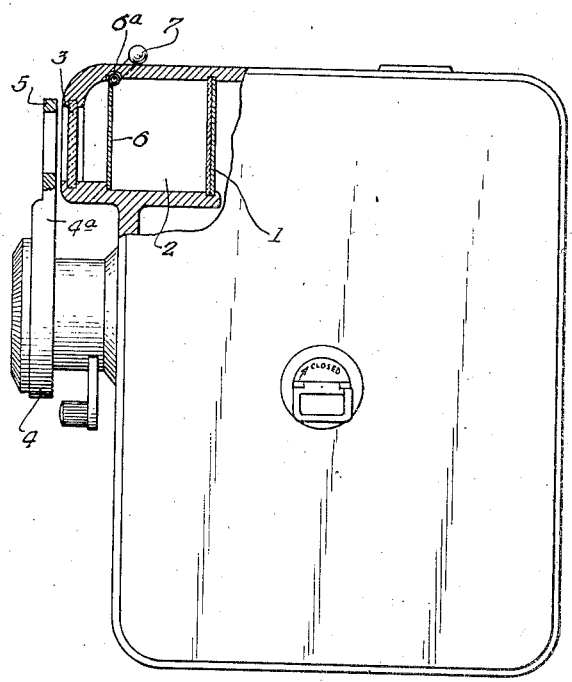
Figure 3:
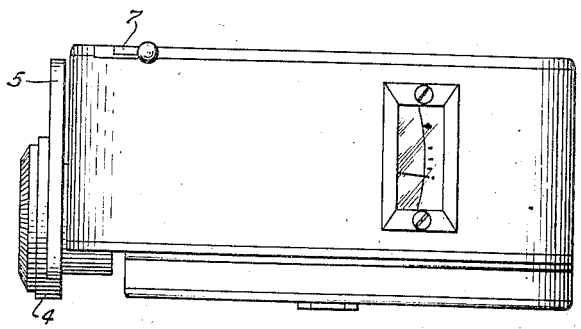

Fig. 1 is a front view of a motion picture camera equipped with a photo electric exposure meter with a portion shown in section, Fig. 2 is a side view of the same partly in section, and Fig. 3 is a top view of the camera.

According to Fig. 2, the photo electric cell 1 of the exposure meter is arranged at the rear end of a light shaft 2, the front or outer end of which may be closed by a transparent glass plate 3 or if desired by a lens. The mounting of the exchangeable lens system 4 of the camera is provided with an upwardly extending projection 4ª which terminates in a frame-like portion forming a diaphragm 5. This diaphragm 5 is arranged in front of the light shaft 2 in alinement with the photo electric cell 1 and influences the amount of light which energizes the latter. The opening of the diaphragm 5 has a certain predetermined relation to the focal length of the lens system with which it is used.

A cover plate 6 is pivotally mounted at 6ª in the light shaft 2 and has attached thereto an outwardly extending lever 7 whereby the cover plate may be rocked out of the way of the incoming light rays, so that the latter may energize the photo electric cell.

What I claim as my invention is:

1. The combination of a photo electric exposure meter, with a photographic or motion picture camera having a casing wall provided with means for interchangeably mounting any one of a plurality of separate lens systems thereon, an opening in said casing wall, a projection extending inwardly from said casing wall and forming a light shaft in alinement with said opening, a photo electric cell positioned at the inner end of said light shaft, and means within said light shaft and operable from the exterior of the camera for selectively admitting and shutting out the light rays which are adapted to energize said photo electric cell, said means in its inoperative position remaining within said light shaft, but out of the way of the incoming light rays, each lens system having attached thereto a diaphragm of a size corresponding to the picture angle of the lens system and coming to lie in front of said opening through which said photo electric cell is adapted to be exposed to light when the lens system is in place on the camera.

2. The combination of a photo electric exposure meter, with a photographic or motion picture camera having a casing wall provided with means for interchangeably mounting any one of a plurality of separate lens systems thereon, an opening in said casing wall, a projection extending inwardly from said casing wall and forming a light shaft in alinement with said opening, a photo electric cell positioned at the inner end of said light shaft, and a pivotally mounted cover plate within said light shaft in front of said photo electric cell for selectively protecting and exposing said cell against and to the incoming light rays respectively, said cover plate in its inoperative position remaining within the light shaft without hindering the light rays from energizing said cell, and an outwardly extending lever for actuating said cover plate, each lens system having attached thereto a diaphragm of a size corresponding to the picture angle of the lens system and coming to lie in front of said opening through which said photo electric cell is adapted to be exposed to light when the lens system is in place on the camera.

HEINZ KÜPPENBENDER.